United States Patent [19]
Gooding, Jr.

[11] 3,727,518
[45] Apr. 17, 1973

[54] CHOKE-CHECK VALVE

[75] Inventor: Harley L. Gooding, Jr., Palatine, Ill.

[73] Assignee: Parker-Hannifin Corporation, Cleveland, Ohio

[22] Filed: Dec. 8, 1970

[21] Appl. No.: 96,014

[52] U.S. Cl............................................91/396, 91/26
[51] Int. Cl...............................................F15b 15/22
[58] Field of Search.........................91/26, 395, 396, 91/405, 406, 394

[56] References Cited

UNITED STATES PATENTS

| | | | |
|---|---|---|---|
| 2,412,975 | 12/1946 | Dunnebeck | 91/396 |
| 3,196,753 | 7/1965 | Maurer | 91/26 |
| 3,303,746 | 2/1961 | Schmoeger | 91/26 |
| 3,486,527 | 12/1969 | Knight | 91/26 |

*Primary Examiner*—Paul E. Maslousky
*Attorney*—Oberlin, Maky, Donnelly & Renner

[57] ABSTRACT

A choke-check valve for use as with a fluid motor to cushion the piston thereof as it approaches the end of its stroke characterized in that the valve has several modes of operation namely, one in which a choke adjusting member is operative to move a spring biased check valve member away from its seat to vary the flow capacity of the cushioning orifice through which fluid passes from the motor as the piston nears the end of its stroke without affecting the full flow characteristics of the check valve through which fluid passes into the motor to move the piston in the opposite direction; another in which the adjusting member moves toward the check valve seat while the check valve member is in seated position thus to define another adjustable cushioning orifice, again without affecting the pressure drop across the check valve when fluid flows into the motor; and yet another in which the adjusting member may be additionally moved toward the check valve seat to restrict fluid flow in both directions through the valve, even to the extent that fluid flow through the valve is stopped whereby the valve further constitutes a shut-off valve. The valve herein is further characterized in that the size or flow capacity of the cushioning orifice may be automatically varied as the piston decelerates during the cushioning portion of its stroke.

11 Claims, 6 Drawing Figures

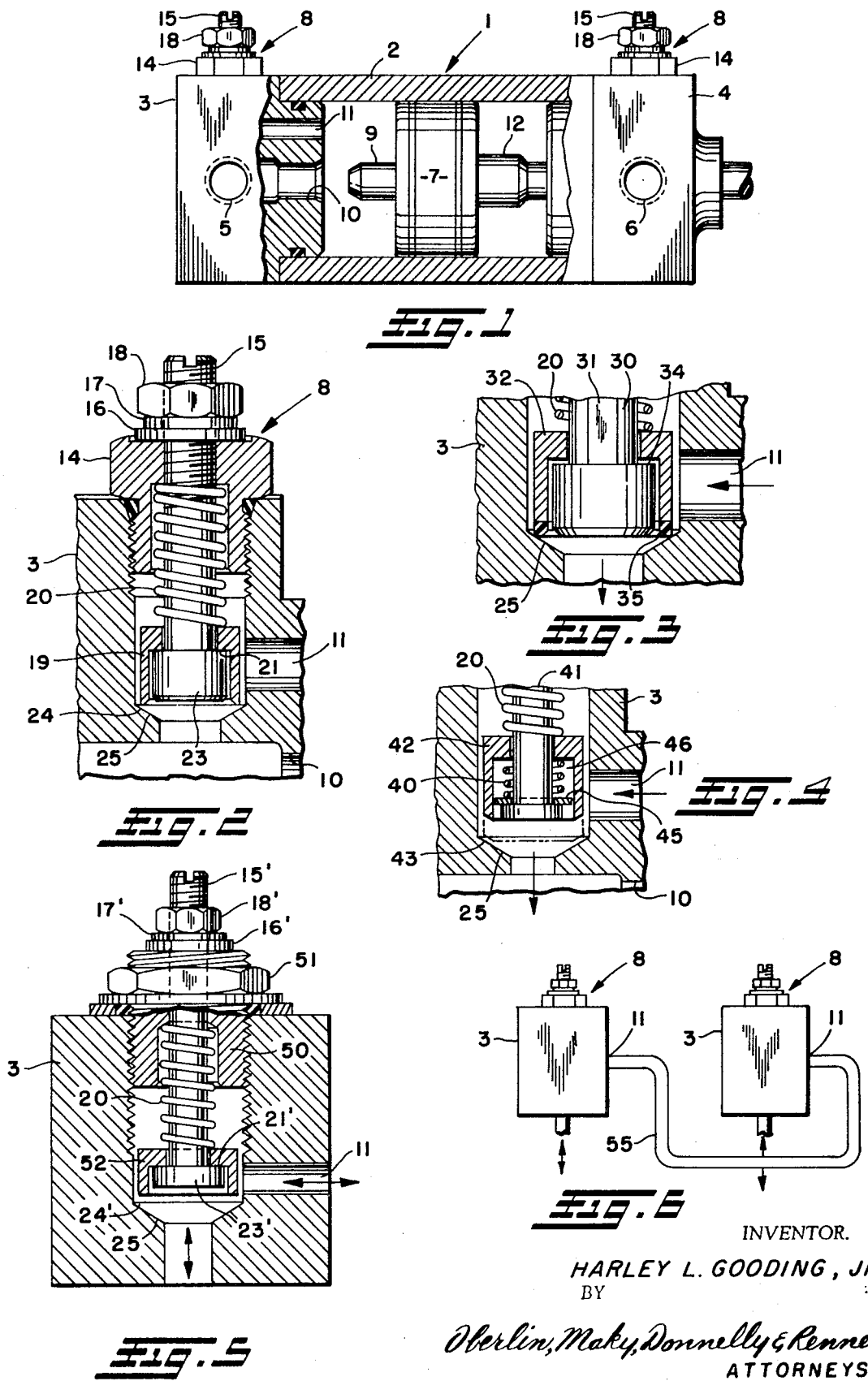

CHOKE-CHECK VALVE

BACKGROUND OF THE INVENTION

It is known to provide a choke-check valve in connection with the cushioning of piston movement in a fluid motor, such valve often being in the form of a combination adjustable needle and check valve wherein a spring biased check valve member is urged away from its seat to permit relatively free and full flow into the motor to accelerate the piston movement, said check valve, when in seated position, cooperating with an adjustable tapered needle or the like to form an annular cushioning orifice to restrict return flow from the motor thus to cushion the movement of the piston as it nears the end of its stroke.

In another known form of choke-check valve, a ring shaped check valve member has a metering orifice radially through the wall thereof and the orifice adjusting member is in the form of a plug having screw threaded engagement with the valve housing and having a close sliding fit in the check valve member bore to partly cover the inner end of the metering orifice to adjust its flow capacity, and as apparent, without the close sliding fit aforesaid, the flow capacity of any annular clearance between the plug and check valve member bore may well exceed the full flow capacity of the metering orifice whereby the position of the plug member in relation to the metering orifice would be immaterial. Moreover in such construction, when the check valve member has a rubber-like resilient seat, the higher the fluid pressure built up on the return side of the piston, the larger the cushioning orifice.

SUMMARY OF THE INVENTION

It is accordingly one object of the present invention to provide a combination choke-check valve which affords free flow of fluid through the check valve into the fluid motor to rapidly accelerate the piston movement and restricted return flow from the motor through an adjustable orifice which is defined either between the check valve member and its seat by movement of an adjusting member in one direction or between said adjusting member and said check valve member by movement of the former in the opposite direction while the check valve member is engaged with its seat thus to provide different ranges of adjustment of the cushioning orifice.

It is another object of this invention to provide a choke-check valve in which check valve biasing spring may be readily adjusted to adjust the pressure drop across the check valve member when fluid flows into the motor.

It is another object of this invention to provide a metering orifice adjusting member which may be adjusted to meter flow of fluid in both directions.

It is another object of this invention to provide a metering orifice adjusting member which may be moved to a position engaging the check valve seat thus to prevent flow of fluid in both directions so that the valve may be operated as a shut-off valve.

It is yet another object of this invention to provide a valve of the character indicated in which the metering orifice size is automatically varied during the piston cushioning operation.

It is yet another object of this invention to provide a choke-check system in which the flow of fluid in opposite directions in a conduit may be adjusted to obtain different and adjustable restricted flow of fluid in opposite directions.

Other objects and advantages of the present invention will appear hereinafter.

BRIEF DESCRIPTION OF THE DRAWING

FIG. 1 is a partial cross-section view of a double acting fluid motor in which the cylinder heads are equipped with choke-check valves according to the present invention to cushion the piston movements in opposite directions;

FIGS. 2 to 5 are cross-section views illustrating various embodiments of the present invention; and FIG. 6 is a side elevation view illustrating two choke-check valves according to the present invention connected together to achieve restriction to different degrees of restricted flow in opposite directions.

DETAILED DESCRIPTION OF THE INVENTION

The double acting fluid motor 1 herein shown comprises a cylinder 2 having cylinder heads 3 and 4 at opposite ends thereof provided with the respective motor ports 5 and 6 for flow of fluid into and from the cylinder 2 to actuate the piston 7 therein in opposite directions. Each head 3 and 4 has secured thereto a choke-check valve 8 constituting the present invention and because both choke-check valves 8 may be of identical or similar construction, only the one at the head end of the cylinder 2 has been illustrated in detail.

As shown, the head end of the piston 7 has an extension 9 or so-called cushioning spear, which is a relatively close sliding fit in the bore 10 of the cylinder head 3 so that as the piston 7 approaches the cylinder head 3, the annular body of fluid in the cylinder 2 around the extension 9 must be displaced through the bypass passage 11 and through the metering orifice of the choke-check valve 8 thus to decelerate or cushion the movement of the piston 7. The rod end of the piston 7 is provided with a cushioning sleeve 12 which similarly will enter a bore (not shown) in the other cylinder head 4 thus to require continued displacement through a bypass passage and a metering orifice respectively contained in the other cylinder head 4 and other valve 8.

In the form of choke-check valve 8 shown in FIGS. 1 and 2, the cylinder head 3 constitutes the valve body into which is screw threaded a plug 14 in which the metering orifice adjusting member 15 has a screw threaded engagement and which is sealed to the bonnet 14 by means of a sealing washer 16 with backup washer 17 adjacent thereto and is locked in adjusted position by means of the lock nut 18. A sleeve-like check valve member 19 is vertically reciprocably movable on the adjusting member 15, and a spring 20 compressed between the check valve member 19 and the plug 14 yieldably urges the radially overlapped shoulders 21 of the check valve member 19 and the head 23 of the adjusting member 15 into engagement. When the valve 8 of FIG. 2 is adjusted as shown in FIG. 2, it can be seen that, when the piston 7 is at the left-hand end of the cylinder 2, fluid under pressure admitted into the left-hand motor port 5 will act on the projected area of the extension 9 to urge the piston 7 toward the right. At the same time, such fluid pressure will move the check valve member 19 upwardly against the spring 20 to permit free flow of fluid into the cylinder 2 to act on the annular area of the piston 7 which surrounds the extension 9, whereby the piston will be rapidly accelerated from its left position. However, when the piston 7 is being moved from the right-hand end of the cylinder 2 toward the left-hand end, after the extension 9 enters the bore 10 in the cylinder head 3, the fluid in the cylinder 2 can be returned to the left-hand motor port 5 only via the metering orifice 24 defined between the check valve seat 25 and the lower end of the check valve member 19. As evident, by turning the adjusting member 15 in the plug 14 the metering orifice 24 may be increased or decreased in size, thus to adjust the degree of cushioning of the piston 7 as it approaches the end of its stroke. In fact, the metering orifice 24 may be adjusted to provide substantially zero flow (maximum cushioning) when the check valve member 19 is adjusted by the adjusting member 15 so that the check valve member 19 just contacts the seat 25 while the shoulders 21 are yet in engagement so that no flow can occur therepast.

If desired, metering can also be achieved by turning the adjusting member 15 so that the head 23 moves down with respect to the seated check valve member 19 in which case the adjustable metering orifice will be determined by the axial spacing between the shoulders 21. As a further feature of the present invention the adjusting member 15 may be moved downwardly so that the head 23 is in close proximity to or in engagement with the seat 25, whereby flow in both directions through the valve 8 may be restricted or completely shut off.

In the form of the invention illustrated in FIG. 2 adjustment of the spring 20 pressure may be achieved by insertion of one or more washers between the plug 14 and the upper end of the spring 20 or between the check valve member 19 and the lower end of the spring 20 or between the shoulders 21 of the adjusting member 15 and check valve member 19.

In the form of the invention shown in FIG. 3 the stem of the adjusting member 30 may have flats 31 or the like thereon so as yet to guide the check valve member 32 while the adjustable metering orifice 34 is defined between the shoulders of said members.

In FIG. 3, the check valve member 32 has a resilient seat-engaging portion 35 bonded or otherwise secured thereto so that the orifice 34 will decrease in size at the beginning of the cushioning operation when the piston 7 velocity is maximum. As the piston 7 is decelerated, the portion 35 progressively moves the check valve member 32 upwardly to progressively increase the cushioning orifice 34 to its adjusted size.

In the form of the invention illustrated in FIG. 4 there is, in addition, a spring 40 between the adjusting member 41 and the check valve member 42 to again define an annular adjustable orifice 43 between the check valve member 42 and the check valve seat 25. The adjusting member 41 and a washer 45 carried thereby define a dashpot 46 between the adjusting member 41 and the check valve member 42. As the fluid is being displaced from the cylinder 2 the pressure acting downwardly on the check valve member 42 exceeds the pressure acting upwardly thereon whereby the check valve member 42 tends to be moved downwardly to decrease the size of the cushioning orifice 43, but rapid movement in that direction is prevented by the spring 40 and the buildup of a higher pressure in the chamber 46. In any case, as the pressure in the cylinder 2 builds up at the beginning of the cushioning operation of the piston 7, the metering orifice 43 will decrease in size to effect a maximum cushioning effect when the piston velocity is maximum. As the piston velocity decreases, the spring 40 will move the check valve member 42 progressively upwardly to progressively increase the size of the cushioning orifice 43. The check valve member 42 is shown in its open position for flow of fluid into cylinder 2 but when the piston 7 moves to the left it will be in the dot-dash line position to define the initial orifice 43 which decreases after the extension 9 enters bore 10 to trap fluid in the cylinder 2 for flow through the bypass passage 11.

Instead of adjusting the pressure of spring 20 by means of washers as previously mentioned, the plug 50 (FIG. 5) may be adjusted axially in the body 3 by loosening the lock nut 51 whereby the pressure drop across the check valve member 52 in the direction of flow of fluid into the cylinder 2 may be varied to desired amount from the exterior of the motor 1 without having to remove the plug 14 as would be required for example in the FIG. 2 construction. Otherwise, FIG. 5 may be similar to FIG. 2 and hence the same reference numerals have been used except for addition of prime marks (').

In the arrangement shown in FIG. 6 fluid which enters at the bottom of the left-hand valve 8 moves the check valve member 19 therein upwardly for flow from the side port 11 through conduit 55 into the side port 11 of the right-hand valve 8 where it encounters the adjustable restriction, thus to control the flow in the stated direction. Now, if fluid is entering the bottom port of the right-hand valve 8, the check valve 19 therein is opened with fluid flowing through conduit 55 into the side port 11 of the left-hand valve 8 and through the adjustable metering orifice therein to control flow of fluid in that direction. As apparent, the metering orifices in said valves 8 may be adjusted as desired to provide equal or different metering characteristics for fluid flow in opposite directions.

I, therefore, particularly point out and distinctly claim as my invention:

1. A choke-check valve for use with a fluid motor of the type having a piston reciprocable in a cylinder comprising a body having a passage with check valve and first and second adjustable restrictor means therein respectively for free flow of fluid under pressure into said cylinder to actuate said piston in one direction and for restricted return flow of fluid for cushioning said piston as it approaches the end of its stroke in the opposite direction; said check valve means comprising a spring biased check valve member which is movable in said body toward and away from a seat in said passage; and an adjusting member for said restrictor means movable in said body and operative selectively in one direction to move said check valve member away from said seat to define said first adjustable restrictor means between said check valve member and said seat and in the opposite direction with respect to said check valve member when engaged with said seat to define said second adjustable restrictor means between said check valve member and said adjusting member; said check valve member having a passage for return flow of fluid via said second adjustable restrictor means.

2. The valve of claim 1 wherein said adjusting member is further movable in such opposite direction into close proximity to or into engagement with said seat thus to restrict or shut off flow through said passage in both directions.

3. The valve of claim 1 wherein resilient support means for said check valve member permits decrease in the size of said second adjustable restrictor means responsive to predetermined increase in fluid pressure in said passage upstream of said second adjustable restrictor means.

4. The valve of claim 1 wherein resilient means between said check valve member and said adjusting member permits decrease in the size of said first adjustable restrictor means defined between said check valve member and said seat responsive to predetermined increase in fluid pressure in said passage upstream of said first adjustable restrictor means.

5. The valve of claim 1 wherein resilient means between said check valve member and said seat permits decrease in the size of said second adjustable restrictor means between said check valve member and said adjusting member responsive to predetermined increase in fluid pressure in said passage upstream of said second adjustable restrictor means.

6. The valve of claim 1 wherein said adjusting member and said check valve member are coaxial with the check valve member guided on said adjusting member for movement toward and away from said seat; said members having radially overlapped shoulders by which said check valve member may be moved away from said seat upon movement of said adjusting member in such one direction to provide said first adjustable restrictor means between said check valve member and said seat.

7. The valve of claim 1 wherein said members are coaxially disposed for movement of said check valve member toward and away from seat; said members having juxtaposed radially overlapping shoulders which define said second adjustable restrictor means when said adjusting member is moved in such opposite direction to separate said shoulders while said check valve member is engaged with said seat.

8. The valve of claim 1 wherein another valve is connected to said valve so that the flow of fluid through the check valve member of one valve flows through one of said restrictor means of the other valve in one direction while fluid flows through the check valve member of said other valve through restrictor means of said one valve in the opposite direction whereby fluid flow in opposite directions may be restricted to equal or unequal magnitude.

9. The valve of claim 1 wherein resilient means between said check valve member and said adjusting member permits decrease in the size of said first adjustable restrictor means between said check valve member and said seat responsive to predetermined increase in fluid pressure in said passage upstream of said first adjustable restrictor means; and wherein said check valve member and said adjusting member define therebetween a dash-pot to control the rate of decrease of said first adjustable restrictor means when fluid flows through said passage from the cylinder and to control the rate of movement of said check valve member away from said seat when fluid flows through said passage into the cylinder.

10. A choke-check valve for use with a fluid motor of the type having a piston reciprocable in a cylinder comprising a body having a passage with check valve and adjustable restrictor means therein respectively for free flow of fluid under pressure into said cylinder to actuate said piston in one direction and for restricted return flow of fluid for cushioning said piston as it approaches the end of its stroke in the opposite direction; said check valve means comprising a spring biased check valve member which is movable in said body toward and away from a seat in said passage; and an adjusting member for said adjustable restrictor means movable in one direction in said body and operative to move said check valve member away from said seat to define said adjustable restrictor means between said check valve member and said seat; said adjusting member being further movable in the opposite direction in said body into close proximity to or into engagement with said seat thus to restrict or shut off flow through said passage in both directions.

11. A choke-check valve for use with a fluid motor of the type having a piston reciprocable in a cylinder comprising a body having a passage with check valve and adjustable restrictor means therein respectively for free flow of fluid under pressure into said cylinder to actuate said piston in one direction and for restricted return flow of fluid for cushioning said piston as it approaches the end of its stroke in the opposite direction; said check valve means comprising a spring biased check valve member which is movable in said body toward and away from a seat in said passage; and an adjusting member for said adjustable restrictor means movable in said body with respect to said check valve member when engaged with said seat to define said adjustable restrictor means between said check valve member and said adjusting member; said check valve member having a passage for return flow of fluid via said adjustable restrictor means, said adjusting member being further movable into close proximity to or into engagement with said seat thus to restrict or shut off flow through said passage in both directions.

* * * * *